(No Model.)

J. COPPERSMITH.
AUTOMATIC SAFETY RELIEF VALVE FOR AIR BRAKES.

No. 527,143. Patented Oct. 9, 1894.

WITNESSES.
F. J. Bassett
O. M. Barkey

INVENTOR.
Jacob Coppersmith
By J. H. Sturgeon
Atty.

UNITED STATES PATENT OFFICE.

JACOB COPPERSMITH, OF ERIE, PENNSYLVANIA.

AUTOMATIC SAFETY RELIEF-VALVE FOR AIR-BRAKES.

SPECIFICATION forming part of Letters Patent No. 527,143, dated October 9, 1894.

Application filed March 19, 1894. Serial No. 504,232. (No model.)

*To all whom it may concern:*

Be it known that I, JACOB COPPERSMITH, a citizen of the United States, residing at the city of Erie, in the county of Erie and State of Pennsylvania, have invented certain new and useful Improvements in Automatic Safety Relief-Valves for Air-Brakes; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

My invention consists in the improvements in automatic safety relief valves for air brakes hereinafter set forth and explained.

In the operation of air brakes, it frequently occurs that they become inoperative, for the reason, that one of the valves in the supply pipe, connecting the brake mechanism with the locomotive has been closed, so that the air gradually leaks out of the pipes on the cars in the rear of said valve, and the brakes on such cars become wholly inoperative; which condition of affairs, being unknown to the engineer, is liable to cause an accident. If however when such condition of affairs occurred, there were automatic means at hand to speedily discharge the air from the pipes on the cars so cut off, the brakes thereon would be automatically operated on such cars, and at once call attention thereto or stop the train, when the difficulty could be remedied. To provide for this I have devised a valve, which I connect to the main air supply pipe, preferably on the last car of the train. This valve is so constructed and adjusted that so long as the pressure of the air in the brake supply pipes is above a given amount, say forty pounds pressure, the valve remains closed and inoperative, but when the pressure from leakage of the pipes or for other reason falls to or below forty pounds, then this valve automatically opens allowing the air in the main pipes to speedily escape, which operates at once to set the brake mechanism on the train.

Figure 1:
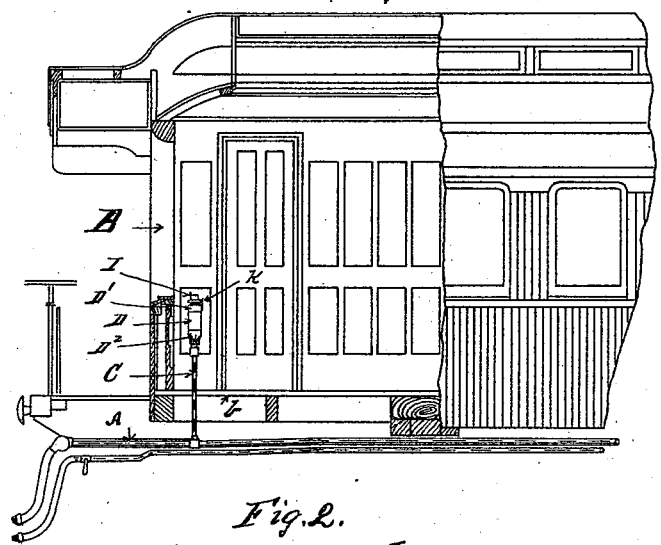
Figure 2:
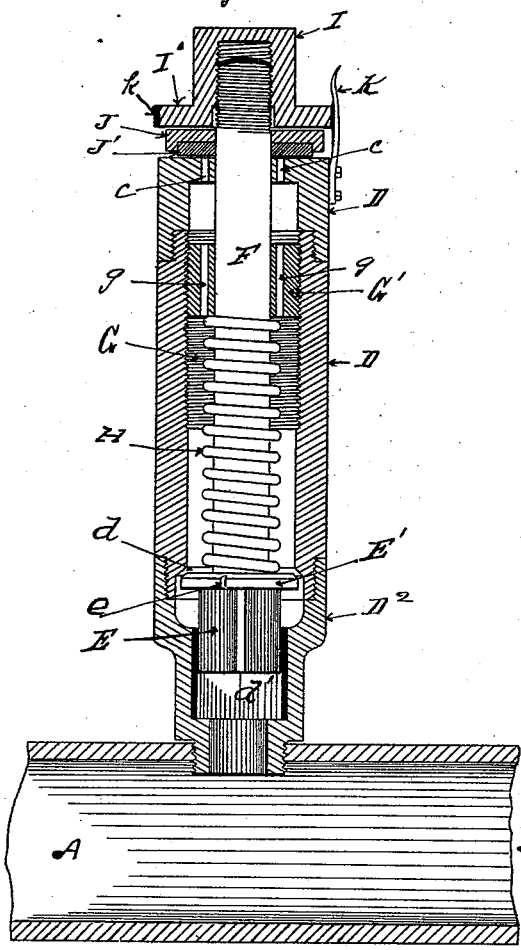

In the accompanying drawings illustrating my invention, Figure 1. shows a section of the end of a car with my improved automatic safety relief valve thereon. Fig. 2. shows a vertical section of my improved automatic safety relief valve connected directly to the air brake supply pipe.

In the construction of my invention shown in the drawings, A is the pipe through which air is supplied to the brake mechanism (not shown) of a car B. To this pipe I connect my improved automatic safety valve hereinafter described, preferably, either by means of a branch pipe C by means whereof the valve is brought up above the floor *b* of the car B, as illustrated in Fig. 1, or by connecting the valve directly with the main air supply pipe A, as illustrated in Fig. 2. This valve I preferably construct with a body, consisting of a central section D, an upper section or cap D' and a lower section $D^2$. In the lower end of the central section D, I make a valve seat *d*, as and for the purpose hereinafter set forth, and in the lower section $D^2$ I make preferably a square chamber *d'* within which the winged lower end E of a vertically moving valve E' operates so as to prevent the rotation of the valve E'. To the valve E' is secured an upwardly projecting stem F which passes up and out through an opening in the center of the top of the upper section or cap D' of the valve body. The inside of the central section D of the valve body, is provided with an internal screw thread G in which a cylindrical nut G' is adapted to be adjusted up and down, and through the center of said nut the valve stem F passes upward. On the valve stem F below the nut G' is a spiral spring H, the lower end of which rests upon the top of the valve E'; the tension of the spring H being adjusted by the movement of the nut G' up or down in the thread G as desired.

The nut G' is provided with vertical openings *g* through which the air escaping by reason of the opening of the valve E' can pass upward. Holes *c* are also provided in the top of the upper section or cap D' of the body through which air passing up through the holes *g* can escape. The end of the valve stem F which projects above the cap D' is screw threaded and provided with a cap nut I, and below the cap nut I is a loose circular valve J provided with packing J' on its under face, so that when the cap nut I is screwed down upon the valve J it operates to force the packing J' down firmly upon the top of the cap D', so as to close the holes c therein, and at the same time to draw the valve stem F upward until the valve E' is firmly seated against its seat d which prevents the operation of the valve, as and for the purpose hereinafter set forth. In the edge of the valve E' is a small notch or groove e which, when the valve E' is closed against its seat d and there retained by the pressure of the air in the pipe A, allows a very small portion of air to constantly escape.

To prevent the cap nut I from being loosened, from vibration or other cause, I provide a spring catch K which is secured to one side of the upper section or cap D' and projects upward and contacts with serrations k in the edge of the flange I' on the lower end of the nut I.

In practice I preferably connect one of these valves to the main air supply pipe A of each car of the train, so that whichever car happens to be the last one in the train, it will be provided with one of these valves. I then screw down the nut I so as to close and render the valves in all of the cars inoperative. As soon, however, as the brake pipes are filled with air to their normal pressure of say seventy pounds, I unscrew the cap nut I of the valve in the last car on the train, and the springs H in these valves being adjusted to, say forty pounds pressure, the air pressure in the pipes A will retain the valve E' firmly closed against its seat d against the pressure of the spring H until the air pressure in the pipe A falls below forty pounds, when the spring H will automatically force the valve E' down from its seat and allow the air in the pipe A to so speedily escape up and out through the holes g and c, as to at once operate the brake mechanism and stop the train. It will be readily understood that this will not occur if there is no obstruction in the pipe A between the air supply on the locomotive and the safety relief valve at the rear end of the train, but would only occur if any one of the air cocks in the supply pipe A were closed or other obstruction intervened in the air supply pipe between the locomotive and the car where this valve is located; and for the purpose of facilitating the ordinary leakage of the pipes I utilize the small notch e in the edge of the valve E', which, if one of the cocks were closed as above stated, would speedily allow sufficient air to escape to lower the pressure below forty pounds; while, if the cocks were all open and the air were being supplied from the locomotive in the usual manner, the amount of air lost through said opening would be immaterial. It will thus be seen that this valve will operate the brakes at any time, should the normal supply of air be cut off from the pipe A to which it is attached.

Having thus fully described my invention, so as to enable others to construct and operate the same, what I claim as new, and desire to secure by Letters Patent of the United States, is—

1. The combination in an automatic safety relief valve for railway car air brakes, of a valve, connected to the air supply pipe of said brakes, a spring adapted to automatically open said valve against the air pressure whenever said pressure falls below a fixed amount, and means for closing said valve, so as to render it inoperative, substantially as and for the purpose set forth.

2. The combination in an automatic safety relief valve for railway car air brakes, of a valve body, a valve seat d in the section D of said valve body, a valve E' adapted to close upon said seat, a valve stem F connected with said valve, an adjustable nut G' surrounding said valve stem, a spring H operating on said valve to open it, and a cap nut I and loose valve on the upper end of the valve stem, substantially as and for the purpose set forth.

In testimony whereof I affix my signature in presence of two witnesses.

JACOB COPPERSMITH.

Witnesses:
  H. J. CURTZE,
  F. J. BASSETT.